(12) United States Patent
Georges

(10) Patent No.: US 7,593,439 B2
(45) Date of Patent: Sep. 22, 2009

(54) LASER DIODE-PUMPED MONOLITHIC SOLID STATE LASER DEVICE AND METHOD FOR APPLICATION OF SAID DEVICE

(75) Inventor: Thierry Georges, Perros-Guirec (FR)

(73) Assignee: Oxxius SA, Lannion (FR)

( * ) Notice: Subject to any disclaimer, the term of this patent is extended or adjusted under 35 U.S.C. 154(b) by 0 days.

(21) Appl. No.: 10/575,163

(22) PCT Filed: Oct. 8, 2004

(86) PCT No.: PCT/FR2004/002540

§ 371 (c)(1),
(2), (4) Date: Apr. 10, 2006

(87) PCT Pub. No.: WO2005/036703

PCT Pub. Date: Apr. 21, 2005

(65) Prior Publication Data

US 2007/0014320 A1    Jan. 18, 2007

(30) Foreign Application Priority Data

Oct. 9, 2003    (FR) .................................. 03 11809

(51) Int. Cl.
*H01S 3/10* (2006.01)
*H01S 3/13* (2006.01)
(52) U.S. Cl. .............................. 372/22; 372/21; 372/32
(58) Field of Classification Search ................... 372/21, 372/22, 32
See application file for complete search history.

(56) References Cited

U.S. PATENT DOCUMENTS

| | | | |
|---|---|---|---|
| 3,502,958 A | 3/1970 | Fleury et al. | |
| 4,395,769 A * | 7/1983 | Damen et al. | 372/7 |
| 4,761,059 A | 8/1988 | Yeh et al. | |
| 4,809,291 A | 2/1989 | Byer et al. | |
| 4,884,276 A * | 11/1989 | Dixon et al. | 372/21 |
| 5,043,996 A * | 8/1991 | Nilsson et al. | 372/94 |
| 5,206,867 A | 4/1993 | Esterowitz et al. | |
| 5,256,164 A | 10/1993 | Mooradian | |
| 5,365,539 A * | 11/1994 | Mooradian | 372/75 |
| 5,588,014 A * | 12/1996 | Okazaki et al. | 372/22 |

(Continued)

OTHER PUBLICATIONS

Fan, "Single-Axial Mode, Intracavity Doubled Nd: YAG Laser," *IEEE Journal of Quantum Electronics*, Sep. 1991, pp. 2091-2093, vol. 27, No. 9, New York.

(Continued)

*Primary Examiner*—Minsun Harvey
*Assistant Examiner*—Michael Carter
(74) *Attorney, Agent, or Firm*—Young & Thompson

(57) ABSTRACT

An intracavity-doubled laser device, includes a pumping laser-diode, a Nd:YAG amplifying medium stimulated by a laser beam with a fundamental wavelength emitted by the laser diode, the output face of the amplifying medium being cut at the Brewster angle for the fundamental wavelength and a birefringent frequency-doubling KNbO3 crystal. The device further includes an isotropic medium (3), inserted between the input face (8) of the birefringent crystal, the amplifying medium (2) and the birefringent crystal (4), being fixed to each other such as to provide a monolithic resonant cavity. Furthermore, the crystal axis "c" of the birefringent crystal includes a non-zero angle <c with relation to the orthogonal direction of polarization of the fundamental wave defined by the Brewster surface.

15 Claims, 2 Drawing Sheets

U.S. PATENT DOCUMENTS

| | | | | |
|---|---|---|---|---|
| 5,809,048 | A | * | 9/1998 | Shichijyo et al. ............... 372/32 |
| 5,838,713 | A | * | 11/1998 | Shimoji ........................ 372/92 |
| 5,850,407 | A | * | 12/1998 | Grossman et al. ............. 372/22 |
| 6,373,865 | B1 | * | 4/2002 | Nettleton et al. ............... 372/10 |
| 7,065,109 | B2 | * | 6/2006 | Bacher et al. ................. 372/21 |

OTHER PUBLICATIONS

Baumert et al., "High-efficiency intracavity frequency doubling of a styryl-9 dye laser with KNbO3 crystals," *Applied Optics*, May 1985, pp. 1299-1301, vol. 24, No. 9, New York.

Dixon et al., "Efficiency blue emission from an intracavity-doubled 946-nm Nd:YAG laser," *Optics Letters*, Feb. 1988, pp. 137-139, vol. 13, No. 2, Washington.

Liu et al., "KNbO3 temperature-tuned blue laser," *Opt. Eng.*, Nov. 1999, pp. 1789-1793, vol. 38, No. 11, Bellingham.

Matthews et al., "Blue microchip laser fabricated from Nd:YAG and KNbO3," *Optics Letters*, Feb. 1, 1996, pp. 198-200, vol. 21, No. 3, Washington.

Hollemann et al., "Frequency-stabilized diode-pumped Nd:YAG laser at 946 nm with harmonics at 473 and 237 nm," *Optics Letters*, Feb. 1, 1994, pp. 194-194, vol. 19, No. 3, Washington.

* cited by examiner

LASER DIODE-PUMPED MONOLITHIC SOLID STATE LASER DEVICE AND METHOD FOR APPLICATION OF SAID DEVICE

FIELD OF THE INVENTION

The present invention relates to a laser diode-pumped monolithic solid-state laser device, and more particularly relates to a monomode intracavity-doubled solid-state laser. It also relates to a method used in such a device.

The present invention can be applied particularly beneficially, but not exclusively, in the field of the generation of blue or green laser luminescence.

The laser emission of a beam of good spatial and spectral quality in the visible spectrum at 473 nm for example, using a multimode diode, is of great benefit for industrial and medical applications in particular. This wavelength, termed harmonic, can be obtained by the doubling of frequency of a laser emission at a wavelength, termed fundamental, at 946 nm from yttrium aluminium garnet doped with neodymium (Nd:YAG).

Generally, an intracavity-doubled laser comprises a laser diode for pumping a solid-state laser, such as Nd:YAG for example, forming an amplifier at 946 nm. In order to produce the doubling, a non-linear crystal is linked to the amplifier converting the near infrared fundamental signal into a visible signal by frequency doubling, (also known as "second harmonic generation SHG"). A fundamental wavelength divided by two is thus obtained. The amplifier and the non-linear crystal are contained in a cavity the two extreme opposite surfaces of which in the path of the laser beam are reflective for certain wavelengths.

However, if a continuous emission is sought, the power of the fundamental emission is less than the power of the laser diode and the frequency doubling is therefore very inefficient.

The American patent U.S. Pat. No. 4,809,291, entitled "Diode pumped laser and doubling to obtain blue light" is known, in which R. L. Byer and T. Y. Fan propose an intracavity doubling in order to increase the power of a fundamental wave at 946 nm and thus increase the doubling efficiency.

In an article entitled "Efficient blue emission from an intracavity-doubled 946 nm Nd: YAG laser" published in 1988 in the journal Optics Letters (vol. 13, pp. 137-139); Dixon et al. present an emission of 5 mW of blue light (473 nm) by an intracavity-doubled Nd:YAG-based microlaser. The Nd concentration is 1.1 at. %. The doubling efficiency is only 2%.

The main problem with these intracavity-doubled lasers is the presence of axial modes and of spurious polarization which reduce the efficiency of the laser and which are the source of high power fluctuations. As an example, Matthews et al., in an article entitled "Diode pumping in a blue (473 nm) Nd:YAG/KNb03 microchip laser" (CLEO'96, vol. 9, p. 174) produce 26.5 mW of blue light with fluctuations of intensity greater than 10%.

More precisely, the intracavity frequency doubling causes selective losses which increase with the pumping power for the main laser emission. When the doubling efficiency increases, the average population inversion of the cavity must increase in order to compensate for the excess loss. However, this allows adjacent modes and the orthogonal polarization emission to start to lase. For the adjacent modes, this effect is in addition to that of "spatial hole burning" which already allows the adjacent modes to lase.

The different modes lasing in the cavity are coupled in the amplifying medium (gain competition) and in the frequency doubling medium (frequency addition). These couplings are non-linear and participate in a complex non-linear dynamic. The latter results in a high or even chaotic fluctuation of power.

If the frequency doubling is of "Type I", the orthogonal polarization modes are not subject to efficient frequency doubling (absence of phase adaptation between the fundamental and the harmonic). These modes stabilize the population inversion by increasing with the pumping power. They slow the conversion efficiency which requires an increase of the population inversion in order to increase. Only "spatial hole burning" effects allow a slight increase in the conversion efficiency.

Several methods have been presented for making the laser monomode or for uncoupling the modes in the non-linear crystal. They can be separated into three categories:

a) The first is the introduction of an etalon into the cavity. This method, disclosed in particular in the American patent U.S. Pat. No. 5,838,713 of Y. Shimoji, poses several problems. The etalon causes losses in the cavity unless it is formed by the faces of the YAG and of the doubling crystal. In the latter case, it requires very great precision in positioning (sub-micrometric) which is difficult to obtain industrially and to stabilize. A way of solving this problem is to bring the amplifying medium into optical contact with the doubling crystal incorporating an angle on one portion of the contact face. This angle produces a small air gap between the two materials. This method weakens the contact and therefore the integrity of a monolithic laser and does not allow the protection of the interface by a bonding agent.

b) The second category involves the polarization of the fundamental. The amplifying medium can be inserted between two quarter wave plates in order to avoid the "spatial hole burning" effect, see in particular G. Hollemann et al., in "Frequency-stabilized diode-pumped Nd: YAG laser at 946 nm with harmonics at 473 nm and 237 nm", Opt. Lett. 19, p. 192, February 1994. One drawback of this method is the introduction of losses into the cavity.

By Type I doubling, is meant an embodiment in which the fundamental laser beam propagates along one of the optical axes of the crystal (in general the slow axis) and the harmonic laser beam propagates along the other optical axis of the crystal, orthogonal to the first. Type I doubling occurs when it is possible to cut the crystal so that the refractive index of an optical axis at the fundamental wavelength is equal to the refractive index of the other optical axis at the harmonic wavelength. This is the case for $KNbO_3$.

By type II doubling, is meant an embodiment in which the fundamental laser beam is present on the two axes and the conversion coefficient is optimized when the polarization of the fundamental laser forms an angle of 45° with respect to the optical axes.

c) The third method consists in reducing the length of the cavity. It was proposed by A. Mooradian in the patent U.S. Pat. No. 5,256,164 October 1993. For a linewidth of 1 nm for emission at 946 nm (compared with 0.6 nm for the line at 1.064 µm), Mooradian's formula requires a cavity length of less than 300 µm, including the YAG and the $KNbO_3$. The Nd concentration in the microchips published or patented to date does not exceed 1.1 at. %. This corresponds to an attenuation of 0.85 $mm^{-1}$ at 808.4 nm, i.e. 8.1% of absorbed pump power per 100 µm of thickness and 15.6% of absorbed pump power per 200 µm. However, the 100 or 200 nm of $KNbO_3$ do not provide adequate conversion efficiency. Thus, a microchip laser according to Mooradian's inequality does not appear to be able to emit more than a few mW of blue light with laser diode pump power of 1 W.

Moreover, an efficient method proposed by T. Y. FAN., "Single-Axial Mode, Intracavity Doubled Nd: YAG Laser", IEEE Journal of Quantum Electronics, vol. 27, 09 Sep. 1991, is known for making an intracavity-doubled laser single-frequency. In this method, the amplifying medium (Nd:YAG) is cut at the Brewster angle with respect to the air. The non-linear, birefringent crystal is struck at 45° by the fundamental (type II doubling). The Brewster window causes significant losses in the orthogonal polarization and prevents it from lasing. It also causes losses at every wavelength at which the polarization has been rotated by the birefringent crystal. This loss modulation as a function of wavelength can make the laser monomode. On the other hand, this method does not apply to a Type I frequency doubling as the signal at the fundamental frequency is on one of the optical axes of the non-linear crystal. However, because of the double refraction, it is not possible to join the amplifying crystal cut at the Brewster angle to the non-linear crystal. In fact, the double refraction introduces phase effects which mean that the beams reflected by the external face of the cavity do not recombine when they return to the amplifier.

SUMMARY OF THE INVENTION

The present invention aims to solve most of the above drawbacks by proposing an intracavity-doubled solid-state laser which is of compact size, provides great operating stability, and allows Type I and II frequency doublings. Another aim of the invention is to propose a tunable solid-state laser capable of operating in monomode. The invention also relates to a solid-state laser which is powerful whatever the power level of the pumping laser diode.

At least one of the above aims is achieved with a laser device comprising:
- an optical pumping means, preferably a laser diode,
- an amplifying medium excited by a laser beam with a fundamental wavelength emitted by the optical pumping means, the output face of this amplifying medium being cut according to the Brewster angle for said fundamental wavelength, and
- a birefringent crystal for frequency doubling.

According to the invention, the device also comprises an isotropic medium inserted between the output face of the amplifying medium and the input face of the birefringent crystal, the amplifying medium and the birefringent crystal being firmly attached to each other so as to constitute a monolithic or composite resonant cavity. Moreover, the crystalline axis "c" of the birefringent crystal forms an angle $\theta_c$ which is not zero with respect to the orthogonal direction of polarization of the fundamental wave, defined by the Brewster surface.

With this device according to the invention, the interface between the isotropic medium and the birefringent crystal is close to the normal. This interposed isotropic medium allows the effects of the double refraction of the birefringent crystal to be limited: in fact, when the angle of incidence tends towards the normal, the angle of the double refraction tends towards zero. It is thus possible to firmly attach the amplifying medium to the birefringent crystal (the doubler) so as to obtain a compact component, which is not the case in the document of T. Y. Fan of 1991.

The combination of an interface at the Brewster angle and a birefringent crystal which is off-axis allows a single mode to be selected. In fact, the Brewster interface causes a selective loss in the orthogonal polarization. Only the wavelengths for which the phase shift due to the birefringence is a multiple of $2\pi$ keep the low loss polarization at the Brewster interface. By adjusting in particular the length of the non-linear crystal, it is possible to select only a single mode in the emission band. In other words, the index of the isotropic medium and the angle $\theta_c$ associated with the length of the cavity can be adjusted in order to allow only a single mode in the cavity.

Thus, even in the case of a type II doubling, it may be expedient to chose an angle $\theta_c$ which is different from 45°.

Moreover, when the doubling efficiency is high, it is possible to increase the losses of the adjacent modes by increasing $\theta_c$.

According to an advantageous characteristic of the invention, the input face and/or the output face of the birefringent crystal is cut according to a slight angle $\epsilon$ with respect to the normal to the direction of propagation of the laser beam. Thus the input and output faces are no longer completely parallel. This characteristic is remarkable for the fact that, in conventional doublings, the angle $\epsilon$ is always equal to zero in order to prevent any double refraction. Setting an angle $\epsilon$ which is not zero therefore goes against conventional practices. According to the characteristics of the device (size of the cavity, index, $\theta_c$ etc.) a person skilled in the art can determine a maximum angle $\epsilon$ beyond which the transmission spectrum at the Brewster face no longer has a transmission peak. By way of example, $\epsilon$ can be chosen to be less than or equal to 1°.

This angle $\epsilon$ causes a slight double refraction in the two parallel and orthogonal orientations. It can be introduced in the dimension parallel to the polarization. The slight double refraction then introduced in the path of the signal can be compensated for by the thermal lens induced by the pump as long as $\epsilon$ is slight. But preferably $\epsilon$ is introduced in the dimension orthogonal to the polarization.

Generally, this angle $\epsilon$ advantageously allows the length of the birefringent crystal to be varied by simple translation of the pump (and therefore of the signal). This variation in length allows tuning of the frequency of the cavity.

According to the invention, the plane orthogonal to the direction of propagation of the fundamental wave can advantageously contain the crystalline axis "c", and form an angle with respect to the "a" and "b" axes of the birefringent crystal so as to obtain a phase matching at the operating temperature between the fundamental wave and the harmonic wave (doubled wave).

The size of the cavity is no longer the only parameter which can be modified in order to obtain a monomode operation. Careful choice of the media, their refractive indices and their size and the orientation of the birefringent crystal, allows monomode and stable operation.

The amplifying medium can be constituted by yttrium aluminium garnet (YAG) doped with neodymium (Nd). This crystal can be cylindrical with an input face forming a plane mirror.

The birefringent crystal is advantageously made of potassium niobate ($KNbO_3$).

According to a first variant of the invention, the isotropic medium is a crystalline medium made from potassium tantalate ($KTaO_3$). The three media are then joined to each other.

According to a second variant of the invention, the isotropic medium is the air. In this case, the surface condition of the output face of the amplifier and of the input face of the birefringent crystal do not require excessive purity.

Preferably, care will be taken choosing an isotropic medium constituted by an isotropic crystal the refractive index of which is close to, for example within 10%, the refractive index of the birefringent crystal. This minimizes the double refraction effects and therefore allows greater tolerance regarding the striking angle of the signal with respect to the interface (around the normal).

According to another aspect of the invention, a method is proposed in which the optical path length covered by the laser beam is varied by translating the laser beam emitted by the pumping means with respect to the input face of the amplifier. More precisely, the laser beam is moved along a plane in which the distance covered by this laser beam in the amplifier varies as a function of the latitude of the passage.

BRIEF DESCRIPTION OF THE SEVERAL VIEWS OF THE DRAWINGS

Other advantages and characteristics of the invention will become apparent by studying the detailed description of an embodiment which is in no way limitative and the attached drawings, in which.

DETAILED DESCRIPTION OF THE PREFERRED EMBODIMENTS

An intracavity frequency-doubled monolithic laser device comprising a Nd: YAG laser emitting at 946 nm, with intracavity doubling at 473 nm with a $KNbO_3$ crystal will now be described, although the invention is not limited to this embodiment.

Figure 1:
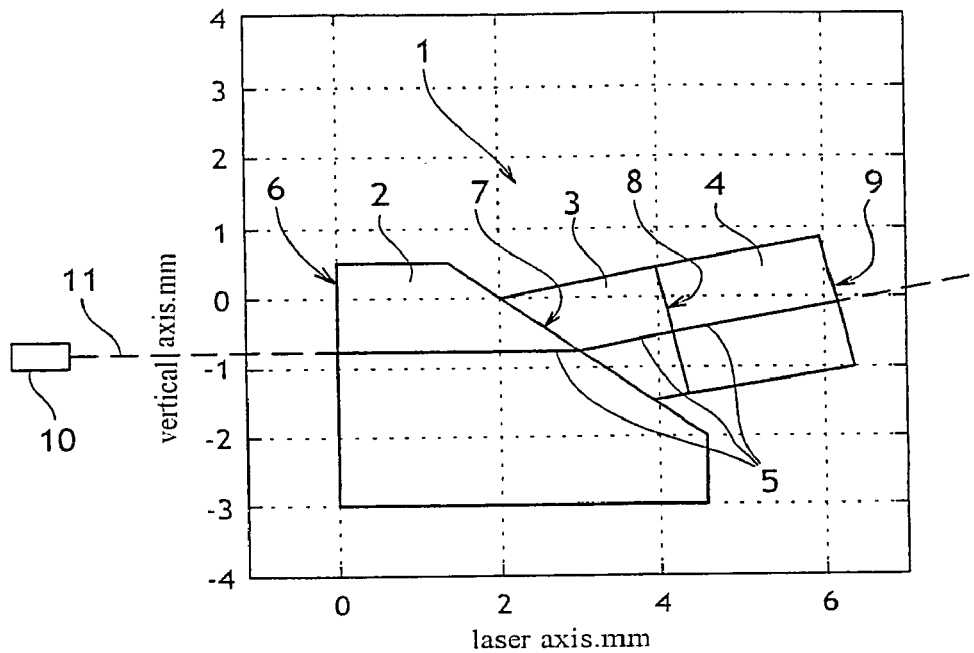
FIG. 1 is a diagrammatic section view of a laser device comprising three crystals joined according to the invention.

With reference to FIG. 1, a pumping laser diode 10 is seen emitting a laser beam 11 at 808 nm towards a cavity 1 composed of an assembly of three crystals 2, 3 and 4. The amplifying crystal 2 is Nd: YAG. Its refractive index is $n_1$=1.82 at 946 nm. The input face 6 of this crystal 2 is treated so as to constitute a plane mirror. Its output face 7 is cut at the Brewster angle calculated from the index $n_1$ and from the index $n_2$ of the isotropic crystal 3. The two crystals 2 and 3 are joined to each other on a portion of the face 7.

The isotropic crystal 3 is constituted by potassium tantalate $KTaO_3$ with an index $n_2$ equal to 2.179 at 946 nm. On its output face 8, a frequency-doubling birefringent crystal 4 is joined, constituted by potassium niobate $KNbO_3$ the refractive index and the diameter of which are approximately identical to those of the isotropic crystal 3.

The two crystals 3 and 4 have colinear geometrical axes. The isotropic crystal 3 is cut at the face 7 so that the laser beam 5 exiting from the Nd: YAG 2 and deflected by the face 7, passes through the crystals 3 and 4 parallel to their geometrical axes.

The input face 6 of the Nd: YAG 2 and the output face 9 of the $KNbO_3$ 4 are treated in a conventional manner in order to constitute a resonant cavity. The beam exiting from the face 9 can be at 946 nm or at 473 nm.

The diagram of FIG. 1 is based on a vertical polarization of the signal at 946 nm in the Nd: YAG. The vertical axis is situated in the plane of the figure, the horizontal axis being perpendicular to this plane. A person skilled in the art will be able to easily adapt this diagram for a linear horizontal or any other type of polarization.

In the birefringent crystal $KNbO_3$, the input face 8 contains the axis c and cuts the plane ab according to an angle φ=32° with respect to the axis b so as to obtain a phase matching between the wavelengths 946 nm and 473 nm at 308 K. A person skilled in the art will be able to modify this angle for a phase adaptation at other temperatures. At 946 nm, the refractive index on the axis c is $n_{3f}$=2.127 and the refractive index on the orthogonal axis is $n_{3S}$=2.238. The birefringence is therefore characterized by $\Delta n_3$=0.111.

The angle of the face 7 φa is the Brewster angle between the YAG and the $KTaO_3$. It is determined by the relationship $\tan(\phi a)=n_2/n_1$. The face 8 is cut at an angle ε of the normal to the direction of propagation of the beam at 946 nm emitted orthogonally to the input face 6. φb et φc are respectively the angles of the faces 8 and 9, and are determined by φb≅2φa−π/2+ε and φc≅2φa−π/2+ε1, ε1 having preferred values comprised between $\epsilon(1n_2/n_{3S})$ and $\epsilon(1-n_2/n_{3f})$. The tolerance regarding φb is of the order of 1°, it is limited by the effects of double refraction. The tolerance regarding φc is less than a few angular minutes, because it is this latter face which closes the cavity.

Also in FIG. 1, for "y"=0, on the vertical axis, the signal propagates over 2 mm in each of the three crystals 2, 3 and 4. The respective propagation distances in the three media for "y"<0 are easily deduced from the three angles φa, φb et φc. The optical distance Lo, product of the distances and the indices is easily calculated as a function of "y". The angle ε is chosen equal to 0.003 rad or 10' of angle. The optical frequencies which can propagate in the cavity are proportional to C/2L with C the speed of light in vacuum. They are represented by crosses and circles in FIGS. 2 to 7.

Figure 2:
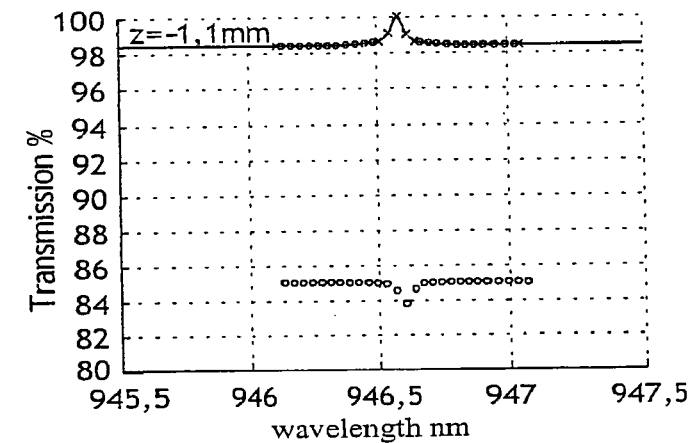
FIGS. 2 to 7 are graphs illustrating the level of power of the different modes prevailing in the resonant cavity of the device of FIG. 1.
Figure 3:
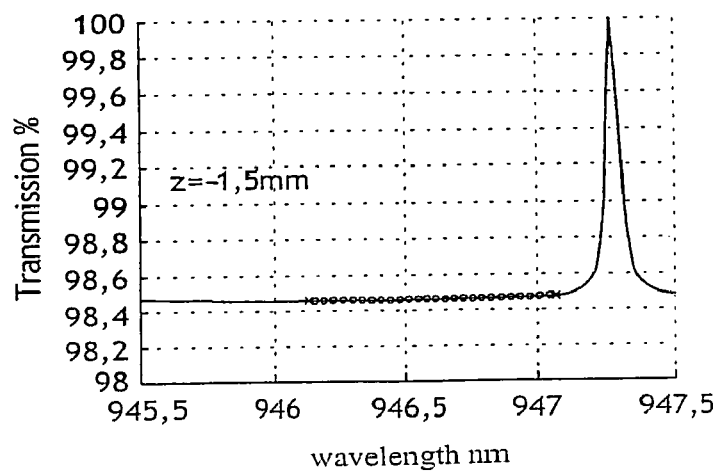

FIGS. 2 to 7 show the losses caused by the face 7 at the Brewster angle when there is entry into and exit from the cavity constituted by the three crystals 2, 3 and 4 by a signal propagating with a vertical and horizontal polarization. The cutting angle of the birefringent crystal 4, i.e. the angle of the axis c with the horizontal, is $\theta_c$=0.3 rad. The amplifying medium 2 is able to provide a gain over a band of 1 nm centered around 946.6 nm. The losses of all of the amplified modes are calculated then shown in FIGS. 2 to 7. In FIG. 2, the orthogonal polarization losses are also represented (in the form of circles). They are not represented in the following, since they are too large to allow a laser oscillation.

The polarization of the fundamental signal is the vertical in the case presented. If the axis c was horizontal, the optical axes would be horizontal and vertical. The fundamental signal would then propagate along an axis of the birefringence and its polarization could no longer be rotated. If the axis c and therefore the birefringence axes are rotated as in the present case, the fundamental is no longer in the birefringence axes and its polarization is therefore rotated during propagation in the crystal. The mode selection by polarization rotation can then be applied.

Figure 4:
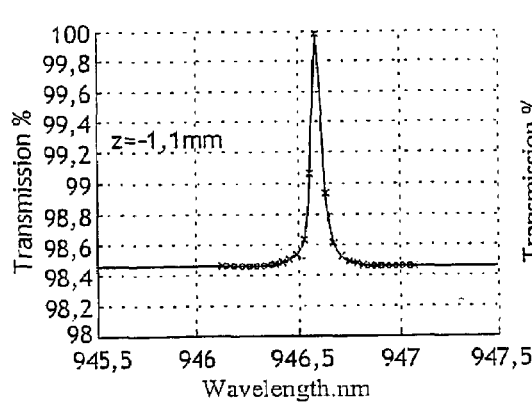
Figure 5:
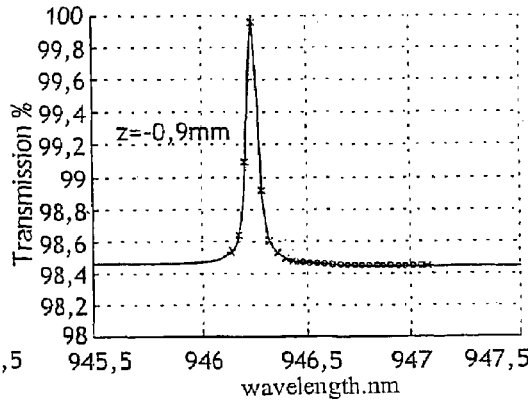
Figure 6:
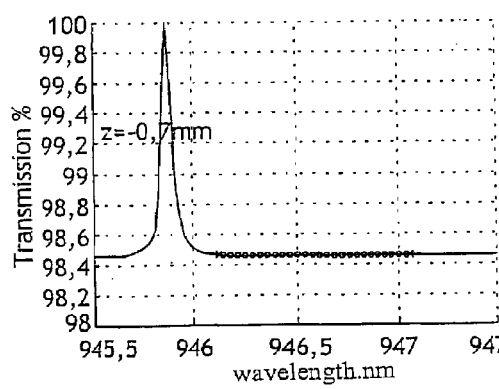
Figure 7:
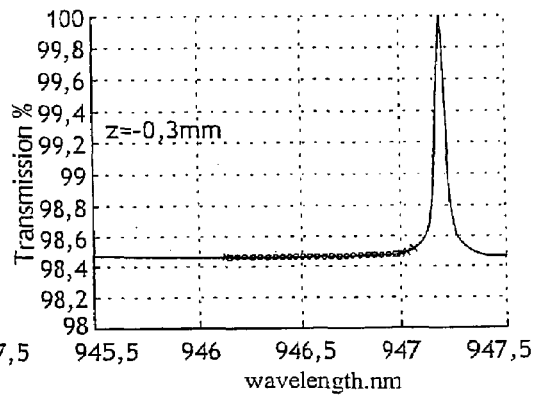

The vertical position "y" of the laser beam is varied in FIGS. 3 to 7. When "y" goes up from −1.4 mm to −0.8 mm, all of the wavelengths of the emission band can be selected successively. It is seen in FIGS. 4 and 5 that the judicious choice of $n_2$, the length of the $KNbO_3$ birefringent crystal 4 and of $\theta_c$ make it possible to select only one mode. The low ratio $n_2/n_1$, in particular allows a narrow width of the transmission peak, making the filter very selective. The angle $\theta_c$ can be increased in order to bring about more losses on the adjacent modes. A vertical shift of 1.2 mm is sufficient to attain the same mode selection (see FIGS. 3 and 7). The laser is therefore monomode and can be tuned by a simple translation of the crystals with respect to the laser diode.

Figure 8:
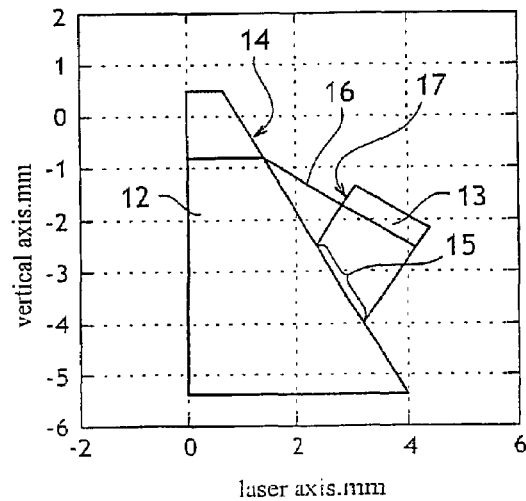
FIG. 8 is a diagrammatic section view of a variant of the device according to the invention in which the intermediate material is replaced by the ambient air.

In FIG. 8 a preferred variant of the device according to the invention is represented in which the isotropic medium is constituted by the air.

The pumping device is not represented.

The output face 14 of the Nd:YAG laser 12 is cut according to the Brewster angle. An upper portion of this face 14 is intended for the passage of the laser beam at 946 nm. On a lower portion of the face 14 a birefringent crystal 13 based on $KNbO_3$ is joined. The latter is cut in such a way that the laser beam 16 exiting from the Nd:YAG and having passed through the air, reaches the input face 17 of this crystal 13. In the path of the laser beam, no material is arranged between the output face 14 of the Nd:YAG laser and the input face 17 of the birefringent crystal 13. The advantage of such a variant is a lesser requirement with regard to the condition of the surfaces on the bonding area 15.

Of course, the invention is not limited to the examples which have just been described and numerous modifications can be applied to these examples without exceeding the scope of the invention.

The invention claimed is:

1. A laser device comprising:
   an optical pumping means (10);
   an amplifying medium (2) excited by a laser beam (11) with a fundamental wavelength emitted by the optical pumping means, an output face (7) of the amplifying medium being cut according to the Brewster angle for said fundamental wavelength;
   a birefringent crystal (4) for frequency doubling, a crystalline axis "c" of said birefringent crystal forming an angle $\theta_c$, the angle $\theta_c$ being not zero with respect to the orthogonal direction of the polarization of a fundamental wave of the laser beam, defined by the Brewster surface; and
   an isotropic medium (3) inserted between the output face (7) of the amplifying medium and an input face (8) of the birefringent crystal, wherein,
   a refractive index of the isotropic medium is within 10% of the refractive index of the birefringent crystal,
   the amplifying medium (2) and the birefringent crystal (4) are firmly attached to each other so as to constitute a monolithic resonant cavity, and
   the isotropic medium is made from potassium tantalate ($KtaO_3$).

2. The laser device according to claim 1, wherein the input face (8) of the birefringent crystal is cut according to a slight angle $\epsilon$ with respect to a normal to a direction of propagation (5) of the laser beam.

3. The laser device according to claim 1, wherein the output face (9) of the birefringent crystal is cut according to a slight angle $\epsilon$ with respect to a normal to a direction of propagation (5) of the laser beam.

4. The laser device according to claim 2, wherein the angle $\epsilon$ is less than or equal to one degree.

5. The laser device according to claim 1, wherein a plane orthogonal to a direction of propagation of the fundamental wave contains the crystalline axis "c", the plane forming another angle with respect to an axis "a" and an axis "b" of the birefringent crystal so as to obtain a phase matching at the operating temperature between the fundamental wave and a harmonic wave.

6. The laser device according to claim 1, wherein the amplifying medium (2) is constituted by yttrium aluminium garnet (YAG) doped with neodymium (Nd).

7. The laser device according to claim 6, wherein the amplifying medium (2) is a cylindrical crystal of YAG doped with Nd with an input face forming a plane mirror.

8. The laser device according to claim 1, wherein the pumping means (10) is a laser diode.

9. The laser device according to claim 1, wherein the birefringent crystal (4) is made from potassium niobate ($KnbO_3$).

10. The laser device according to claim 2, wherein the output face (9) of the birefringent crystal is cut according to a slight angle $\epsilon$ with respect to the normal to the direction of propagation (5) of the laser beam.

11. The laser device according to claim 3, wherein the angle $\epsilon$ is less than or equal to one degree.

12. The laser device according to claim 10, wherein the angle $\epsilon$ is less than or equal to one degree.

13. A laser device comprising:
   an optical pumping means (10);
   an amplifying medium (2) excited by a laser beam (11) with a fundamental wavelength emitted by the optical pumping means;
   a frequency doubling birefringent crystal (4); and
   an isotropic medium (3) inserted between a final output face (7) of the amplifying medium and an input face (8) of the birefringent crystal, wherein,
   the final output face (7) of the amplifying medium toward the birefringent crystal is cut according to the Brewster angle for said fundamental wavelength,
   the amplifying medium (2) and the birefringent crystal (4) are attached to each other so as to constitute a monolithic resonant cavity,
   a crystalline axis "c" of the birefringent crystal forms a nonzero angle $\theta_c$ with respect to an orthogonal direction of the polarization of a fundamental wave of the laser beam, defined by the Brewster surface,
   a refractive index of the isotropic medium is within 10% of a refractive index of the birefringent crystal, and
   the isotropic medium (3) is constituted by potassium tantalate $KtaO_3$.

14. The laser device of claim 13, wherein,
   the final output face (7) of the amplifying medium (2) is cut at the Brewster angle, the Brewster angle calculated from a first index n1 and from a second index n2 of the isotropic medium (3), and
   the amplifying medium and the isotropic medium (3) are joined to each other on a portion of the final output face (7).

15. The laser device of claim 14, wherein,
   a final output face (8) of the isotropic medium (3) is joined to the birefringent crystal (4),
   the isotropic medium (3) and the birefringent crystal (4) have colinear geometrical axes and approximately identical diameter, and
   an input face of the isotropic medium (3) is cut at the final output face (7) so that the laser beam (5) exiting from the amplifying medium (2) and deflected by the final output face (7) passes through the isotropic medium (3) and the birefringent crystal (4) parallel to their geometrical axes.

* * * * *